June 11, 1968 — W. H. SQUIER ET AL — 3,388,018
PROCESS FOR MANUFACTURING MOLDED ARTICLES
Filed Nov. 3, 1965 — 2 Sheets-Sheet 1
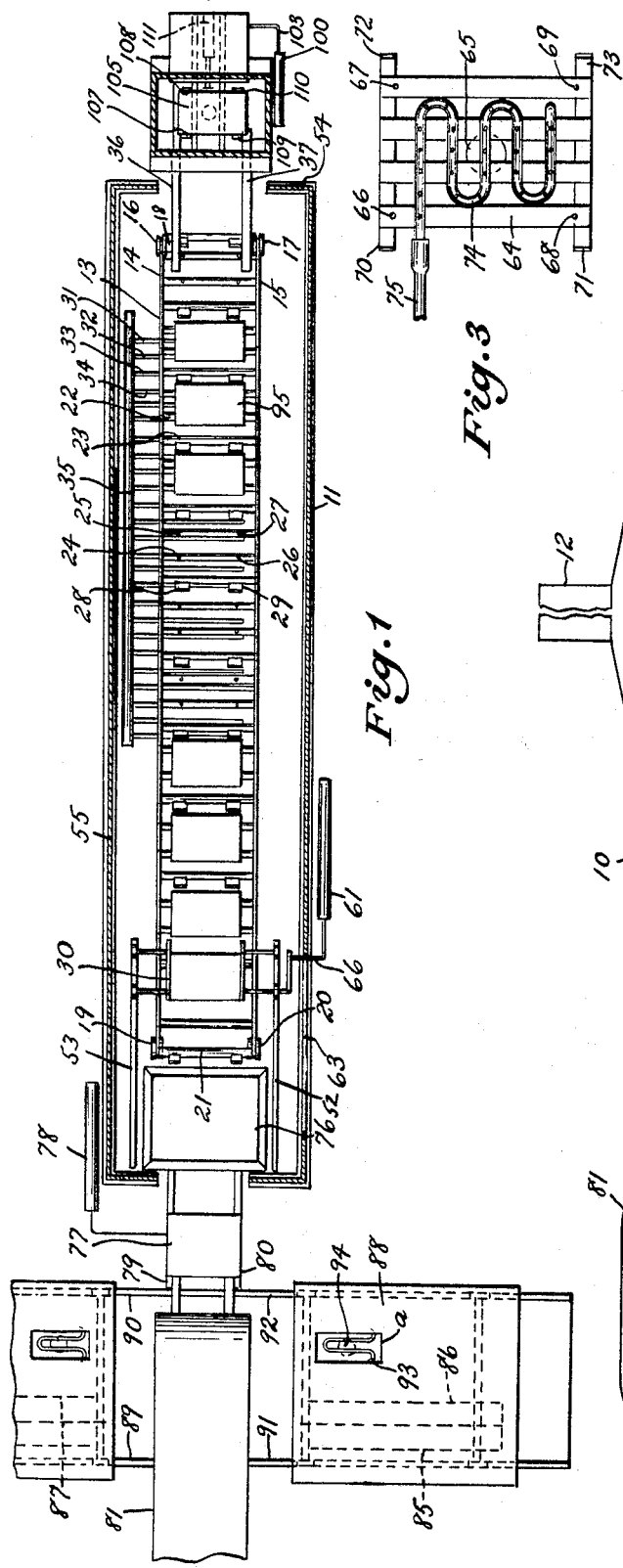
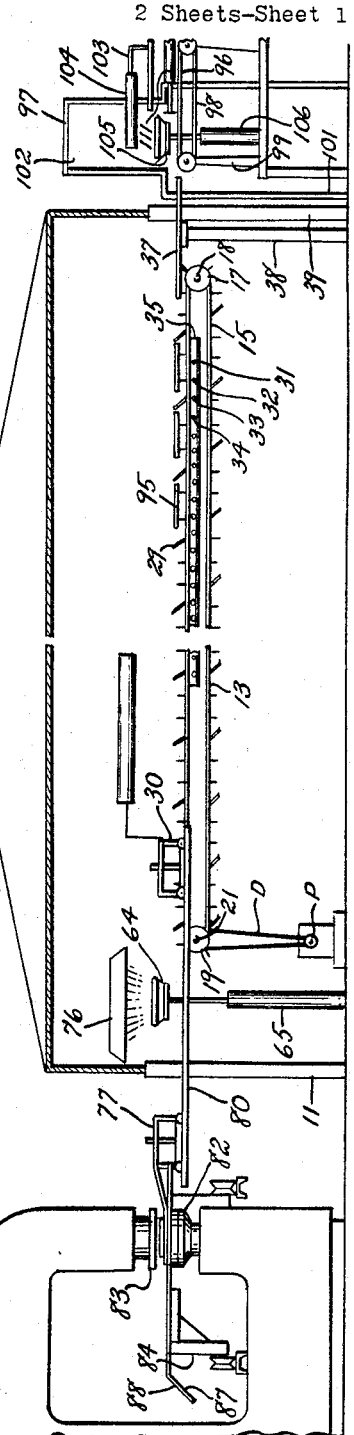
INVENTORS
WILLIAM H. SQUIER
JERRY A. WALL
BY Thomas M. Hammond
ATTORNEY June 11, 1968 W. H. SQUIER ET AL 3,388,018
PROCESS FOR MANUFACTURING MOLDED ARTICLES
Filed Nov. 3, 1965 2 Sheets-Sheet 2

INVENTORS
WILLIAM H. SQUIER
JERRY A. WALL
BY
Thomas M. Hammond
ATTORNEY

United States Patent Office 3,388,018
Patented June 11, 1968

3,388,018
PROCESS FOR MANUFACTURING
MOLDED ARTICLES
William H. Squier, Charlotte, N.C., and Jerry A. Wall,
Greenville, S.C., assignors to J. P. Stevens & Co., Inc.,
New York, N.Y., a corporation of Delaware
Filed Nov. 3, 1965, Ser. No. 506,199
13 Claims. (Cl. 156—242)

ABSTRACT OF THE DISCLOSURE

Process for manufacturing a molded article composed of substrate and vinyl material by first heating the lower surface of the vinyl material until it is molten and then withdrawing the heat from the lower surface, heating the upper surface until it is molten and applying the substrate to the molten upper surface after gelation has begun in the lower surface.

---

This invention relates to molded articles. More particularly, the invention relates to a process for manufacturing molded articles.

Molded articles find wide usage in a variety of industries and in modern industrial applications. For the sake of simplicity, however, the present process will be described as they are utilized in the manufacture of automotive carpets, although it is to be understood that the process and apparatus disclosed herein are useful in the manufacture of molded articles suitable for a wide variety of end-uses.

In accordance with the present invention, there is provided a process for manufacturing a molded article which has a substrate having a vinyl material attached to at least part of the area of said substrate and which comprises heating the lower surface of the vinyl material at a temperature and for a time at least sufficient to make the vinyl material molten at least in the vicinity of the lower surface, withdrawing heat from the lower surface of the vinyl material to commence gellation or solidification thereof while heating the upper surface of the vinyl material at a temperature and for a time at least sufficient to make the vinyl material molten, at least in the vicinity of the upper surface after which the molten upper surface of the vinyl material and the substrate are brought into contact with each other and maintained in contact until the upper surface of the vinyl material gells.

The substrate to which the vinyl material is attached in carrying out the practice of the instant invention can vary widely. For example, the substrate can be a multilayer component or a single layer component such as a film or other sheet material such as a textile sheet material or the like in either a premolded or unmolded state. Moreover, the surface of the substrate to which the vinyl material is attached can be either smooth or uneven in texture. Preferably, however, the substrate is a tufted textile carpet.

The vinyl material to be attached to the substrate in accordance with the invention can be any suitable moldable vinyl composition such as a vinyl powder. Such vinyl materials in the form of colloidal dispersions or powders are well known and utilized for molding, casting films, coatings or printing with synthetic materials.

In accomplishing the instant process, the vinyl material is generally delivered to a confined area or zone and heat is applied thereto to convert the vinyl material to a molten or fused state at least in the vicinity of the lower and upper surfaces of the vinyl material. Generally, temperatures in a range of about 115° C. to about 215° C. are utilized and preferably temperatures in a range of about 175° C. to about 200° C. are used. The time required to convert the vinyl material in the vicinity of its lower and upper surfaces to the molten or fused state is dependent on the temperature as well as the area involved. Particular time and temperature relationships most suitable in converting the vinyl material in the vicinity of the lower and upper surfaces to the molten or fused state can be readily determined. However, for best results, temperatures within the ranges set forth above are recommended.

Heating of the lower surface first allows entrapped air to escape. If the upper surface is first heated the resulting fused film which is formed thereon prevents the escape of the entrapped air, thereby leading to a poor quality product when the vinyl is attached to a substrate. For example, the vinyl develops crater or pockmarks on its surface and the bond between the vinyl and substrate is weakened. Efforts to heat the entire mass of vinyl from the bottom presents difficulties in heat transmission so that the bottom tends to scorch before the top fuses.

After the conversion of the vinyl material to the molten or fused state in the vicinity of its lower surface is achieved, the material is then subjected to a second heating step during which heat is applied to the upper surface of said vinyl material once more at a temperature and for a time at least sufficient to make the material molten or fused at least in the vicinity of the upper surface. Simultaneously with this heating step as applied to the upper surface, the lower surface has heat withdrawn therefrom to permit that surface to commence gellation or solidification. If desirable, the withdrawal of heat from the lower surface can take place for the entire heating period during which heat is being applied to the upper surface. However, it is generally preferred that withdrawal of heat from the lower surface of the vinyl material be carried out by positive cooling during the terminal portion of the time period that heat is applied to the upper surface.

Regardless of which surface is being heated, application of the heat can be made in any suitable fashion. For example, heating can be carried out through the use of an open flame or by radiant heating apparatus or other suitable heating means. It is generally preferred on the other hand that the first heating step be accomplished by utilizing an open flame and the second heating step be accomplished by utilization of a radiant heater as explained more fully hereinbelow.

Withdrawing of heat from the lower surface of the vinyl material can be accomplished in any suitable manner. For example, the lower surface may simply be permitted to cool without positive application of a cooling medium. On the other hand, it is preferred that positive cooling means be applied to the lower surface of the vinyl material in order to bring about gellation or solidification thereof. Such positive cooling means may include cooling with a stream of water, or an aqueous spray, as well as with a stream of air or the like, or any other suitable means. Preferably, however, the lower surface of the vinyl material is cooled by applying an aqueous spray against the underside of the confined area in which the vinyl material is contained.

As pointed out hereinbefore, it is preferred that the cooling of the lower surface of the vinyl material take place during the terminal portion of the heating cycle of the upper surface. The time required for cooling is dependent upon the size of the area to be cooled as well as the temperature of the lower surface of the vinyl material being cooled. In any case, before the vinyl material contained in the confined area progresses to the next step of operation, the lower surface thereof should be cooled to a temperature at which gellation has at least started or is relatively well progressed. This is important especially in the manufacture of molded automotive carpets wherein a vinyl heel pad is being attached thereto, since the utilization of a tufted textile material such as a premolded carpet, to which the heel pad is to be attached will very often be of poor quality due to "grinning" or protrusion of the tufts through the surface of the heel pad, if a sufficient amount of gellation or solidification has not taken place when the carpet and the vinyl material are brought into contact with each other.

At the same time, however, it is necessary to avoid cooling the material to such a degree that solidification or gellation of the upper surface of the vinyl material is commenced. This is especially important in order to achieve a good bond between the substrate being utilized and the vinyl material. If gellation of the upper surface should proceed to an appreciable extent, a uniform bond throughout the entire surface of the vinyl material that comes in contact with the surface of the substrate will not be achieved. It is preferable, therefore, in some cases in the practice of the invention that the peripheral area of the lower surface of the vinyl material not be positively cooled in order to ensure a substantially uniform and permanent bond between the vinyl material and the substrate around the peripheral areas of these materials.

As pointed out hereinbefore, after the heating and cooling steps have been carried out, the substrate and the upper surface of the vinyl material, still in a molten or fused state, are brought into and maintained in contact with each other until the vinyl material has become completely gelled or solidified. Contact between the substrate and the vinyl material is preferably accomplished under pressure. At least enough pressure should be utilized to ensure intimate contact between the vinyl material and the substrate throughout entire area of contact. The particular amount of pressure applied to bring about such intimate contact will vary and it is possible to bring the surfaces together and obtain a bond even without positive external pressures being applied. Generally, however, pressure in the range of 10 p.s.i.g. to about 1,000 p.s.i.g. are suitable, although it is preferred, especially in the automotive carpet field where a tufted textile carpet is being molded, with a vinyl heel pad, to employ pressures in a range of about 250 p.s.i.g. to about 400 p.s.i.g.

The contacting of the molten or fused upper surface of the vinyl material and the substrate can be carried out in any suitable mechanical manner as explained more fully hereinbelow. Regardless of the particular manner employed, intimate and uniform contact between the vinyl material and the substrate must be accomplished. In the manufacture of automotive carpets wherein a tufted textile material is being employed, it is beneficial to heat the tufted surface of the textile at a temperature in a range of about 75° C. to about 205° C. before it is brought into contact with the molten or fused surface of the vinyl material. This temperature, of course, will vary according to the type of tufted textile which is being heated. Polypropylene fiber, for example, could not be exposed to temperatures in excess of about 150° C. The preferred temperature wherein nylon/rayon blends are being employed is in the range of about 150° C. to 180° C. Heating of the tufted textile substrate allows the tufts to penetrate into the molten or fused surface of the vinyl before the vinyl surface can begin its rapid change into a stage of solidification. The tufts penetrate the surface of the vinyl material and come into such intimate contact therewith that they are essentially completely surrounded by vinyl material. However, the tufts do not penetrate to the opposite surface of the finished product or protrude through the vinyl material because this surface of the vinyl has already begun to solidify due to the positive cooling action to which it is subjected earlier in the process.

In order to understand the present invention more fully, attention is directed to the attached drawings wherein:

FIG. 1 is a schematic plan view of apparatus for carrying out the process of the invention;

FIG. 2 is a side elevation of FIG. 1;

FIG. 3 is a plan view of receiving platform at the discharge end of the oven showing the cooling mass;

Figure 4:
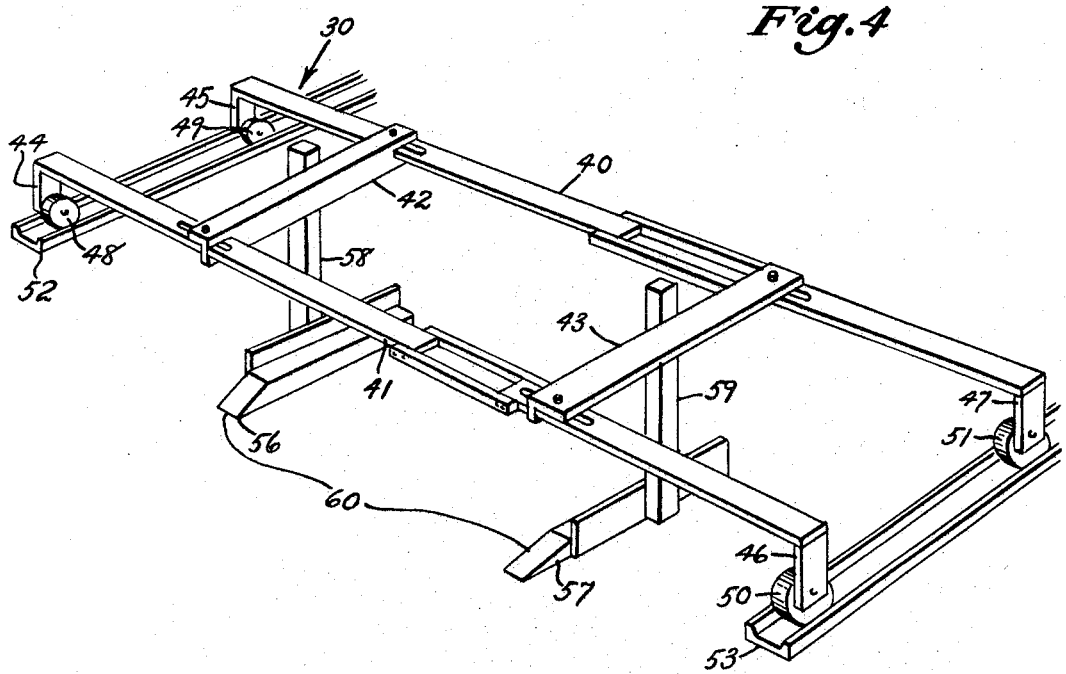
FIG. 4 is a detailed view in perspective of the rack conveyor.

Referring more particularly to the attached drawings, apparatus suitable for carrying out the process of this invention includes an oven generally designated by numeral 10 and having an open bottom. The oven is supported on a frame 11 and can be constructed of metal or any other suitable material. The oven is equipped with a vent or flue 12. Located within the oven and extending from the entrance thereof toward the exit is an endless rod type conveyor means 13.

The conveyor 13 consists of a pair of endless sprocket chains 14 and 15 disposed on each side of the oven. The chains are guided by idler sprockets 16 and 17 located near the entrance to the oven. The sprockets are splined to the ends of shaft 18, to ensure their rotation at the same speed to move the chains in constant phase with respect to each other. At the other end of the path of travel of the conveyor a similar set of sprocket gears 19 and 20 are splined to the ends of a shaft 21. Shaft 21 is connected to a suitable source of power P through a convenient drive D to move the upper run of chains 14 and 15 in a path of travel toward the exit end of the oven.

Chains 14 and 15 are connected by a plurality of rods 22 and 23 of square or rectangular cross-section to complete the structure of conveyor 13. On each two consecutive rods and spaced inwardly from the ends thereof are horizontally projecting supporting pins 24, 25, 26 and 27 to support an article, such as a mold, being carried by the conveyor, away from the surface of the rods, thereby exposing as much of the bottom surface of the article as possible. On every third rod are upright tongues or projections 28 and 29 spaced inwardly from the ends thereof to properly center a conveyed article such as a mold, on the support pins and to guide the article such as a mold, on the supoprt pins and to guide the article onto rack 30, positioned after the conveyor as described more fully hereinafter. Accordingly, the conveyor 13 permits the bottom or lower surface of a conveyed article, such as a mold, to be substantially completely disposed, as well as properly positioned on the rods and guided thereby. Although the construction illustrated is preferred, any other suitable construction which accomplishes the same purpose can be utilized as the conveying means 13.

Located below and in a plane parallel to the path of travel of the conveyor are heating means such as a plurality of gas jets 31, 32, 33 and 34 extending across the width of the oven. The gas jets are connected to a manifold 35 located at one side of the oven and which leads gas to the jets from a source of supply (not shown). Other types of heating means, such as radiant or electrical heaters, can also be used.

At the entrance end of the oven are a pair of stationary tracks 36 and 37 supported by horizontal members 38 and 39 anchored in any convenient manner to the framework of the oven. The tracks are disposed in a plane parallel to and slightly above the path of travel of the conveyor means 13 so that the tongues or projections 28 and 29 of the conveyor will come into contact with the trailing edge of an article, such as a mold and guide it onto the conveyor.

Rack conveyor means 30, located, as illusrtated, in its rearmost position ready to receive an article or mold from conveyor means 13 comprises front and rear transverse supports 40 and 41 held in spaced relationship to each other by horizontal spacers 42 and 43. At each end of supports 40 and 41 are vertically extending members 44, 45, 46 and 47, each equipped with wheels or rollers 48, 49, 50 and 51. The wheels ride in tracks 52 and 53, supported on frame 11 and located just inside the side walls 54 and 55 of the oven 10. Tracks 56 and 57, are supported in a plane just above the plane of the path of travel of conveyor 13 by supporting members 58 and 59 attached to horizontal spacers 42 and 43. The spacers are attached to the transverse supports 40 and 41 far enough in from their ends to provide enough space between the tracks to receive a conveyed article or mold and properly support it as well as to allow the tongues or projections 28 and 29 to pass between them without interference. At their receiving end, tracks 56 and 57 are beveled downwardly as shown at 60 for easy reception of an article or mold from conveyor means 13.

Located outside the wall 54 of oven 10 is a pneumatic cylinder 61 adapted to move rack 30 toward the exit end of the oven. The cylinder 61 is connected to rack 30 by a linking member 62 which passes through slot 63 in side wall 54 of the oven and is attached at one end to the cylinder piston and at the other end to the transverse support member 40 of the rack. When a conveyed article or mold is delivered to the tracks of the rack, the cylinder is adapted to be automatically activated by any convenient means to carry the rack along tracks 52 and 53 to the exit end of the oven and then return to its starting point when the article or mold is removed therefrom.

Located at the exit end of the oven is receiving platform 64 which is pneumatically raised or lowered by means of piston 65. When the rack is in position over receiving platform 64, it is raised upwardly to remove an article, such as a mold, from the tracks of the rack 30 before the rack is returned to its starting point. Platform 64 has supporting pins 66, 67, 68 and 69, disposed on its upper surface for supporting the article or mold received from the rack 30. In order to center the article or mold on the platform, projecting tongues 70, 71, 72 and 73, are also located thereon near the four corners. Tongues 70 and 71 located near the edge of the platform closest to the exit of the oven can be spring biased if desired, or arranged in any other convenient manner, so that they can be forced down out of the path of the mold when it is removed from the platform, as described more fully hereinbelow.

Cooling means are disposed on the upper surface of receiving platform 64. Although any cooling means can be used, that illustrated is a coil of copper tubing 74 covering the top of the platform substantially completely except for the peripheral areas thereof, thus assuring that the peripheral areas of the article or mold seated on the platform are not cooled. The copper cooling coil 74 is connected to a length of flexible tubing 75 which leads to a suitable source of water or other coolant. The flexible tubing permits the platform to be raised and lowered without interference. Platform 64 is of a size which permits it to be raised upwardly between the tracks 56 and 57 of rack 30 and to lift the article or mold upwardly without interference to the vicinity of heating means 76 located above the horizontal path of travel of the article in the oven.

Heating means 76, as shown, is a radiant heater properly equipped with switches and timing devices (not shown) to heat the material brought into the vicinity thereof on its upper surface for the required period of time although any other suitable heating means can be employed.

A rack conveyor means 77 similar in construction to rack 30, except that the mold supporting tracks are adapted to jut out beyond the front transverse member corresponding to 40, is located just outside the exit end of the oven and adapted to operate pneumatically in a timed sequence by piston 78. The tracks 79 and 80 of this rack project into the oven 10 carrying the rack into position under the platform 64, thus permitting an article or mold on the platform to be deposited thereon as the platform moves downwardly after the heating cycle of the radiant heater is completed.

The tracks 79 and 80 of the rack extend far enough at the other end to bring the rack into proper position with bonding means 81, such as a C-frame press or other suitable mechanism, depositing the article or mold properly in the press and subsequently retracting a sufficient distance to permit the press to be activated without interference.

The bonding means 81, as illustrated, is a C-frame press having upper and lower platens 82 and 83 respectively. Generally, the lower platen is cooled in any convenient manner in order to aid in gelling of the material in the mold during the bonding stage of the process.

Disposed on either side of the press are support means 84 and 85 having frames 86 and 87 shaped to carry a buck 88. The frames are arranged to ride on tracks 89, 90, 91 and 92, into and out of the press. The buck 88, as illustrated, conforms to the shape of a molded carpet for an automobile. It is to be understood, however, that it can be any desired shape. Buck 88 has an opening $a$ therein to permit that portion of a carpet or other substrate to which the vinyl material is to be bonded to be exposed.

A heater 93 located below the buck 88, is adapted to be raised or lowered by pneumatic piston 94 into proximity with the portion of the substrate exposed through the opening in the buck when the support means 85 is in its starting position outside the press, thereby heating the exposed surface of the substrate to ensure good penetration and bonding between substrate and material in the mold.

The press 81, as shown, is constructed so that the upper platen 82 is lowered into operating position. However, if desirable, the press can also be constructed so that the frame carrying the buck and carpet move into the press in proximity to the upper platen and the lower platen can be raised upwardly during the operating cycle.

In the manufacture of automotive carpets or other similar items, the mold 95 or other confined area which carries vinyl material can be introduced into the oven 10 in any convenient manner after being properly loaded. It is preferred, however, that conveying means 96 be properly located with respect to the loading device 97 near the entrance to the oven.

The conveying means 96 has an endless split belt 98 carried on a suitable framework 99 and delivers an empty mold to the vicinity of the loading device 97 where it is properly transferred to position on the loading device by means of pneumatic piston 100.

The loading device 97 includes supporting means 101 and a supply bin 102 for holding vinyl materials. The device is equipped with a retractable plate or cover 103 which is automatically opened and closed by means of a pneumatic piston 104 to permit delivery of a specific amount of vinyl material to the mold. Disposed below the outlet of the supply bin 102 is a guide plate 105 which is raised or lowered by means of pneumatic piston 106. The guide plate 105 is equipped with indexing means such as spring biased projecting tongues 107, 108, 109 and 110 to properly center a mold thereon when it is delivered from the conveying means 96.

The peripheral edge of the mold and the edge of the exit of the supply bin are machined to mate properly and avoid loss of material when the platform raises the mold into contact with the supply bin for loading.

A pneumatic piston 111 conveniently located on the supporting means 101 is adapted to shunt a loaded mold into stationary tracks 36 and 37 mounted at the entrance end of the oven from which it is transferred to the rod conveying means as explained hereinabove.

All of the various elements of the apparatus set forth in detail are equipped with suitable timing devices and automatic switches (not shown) so that an automatic sequence of operation can take place throughout the entire process. It is to be understood that the various elements of the apparatus can be constructed according to differing specific requirements without altering their fundamental function in the practice of the process of this invention.

Figure 5:
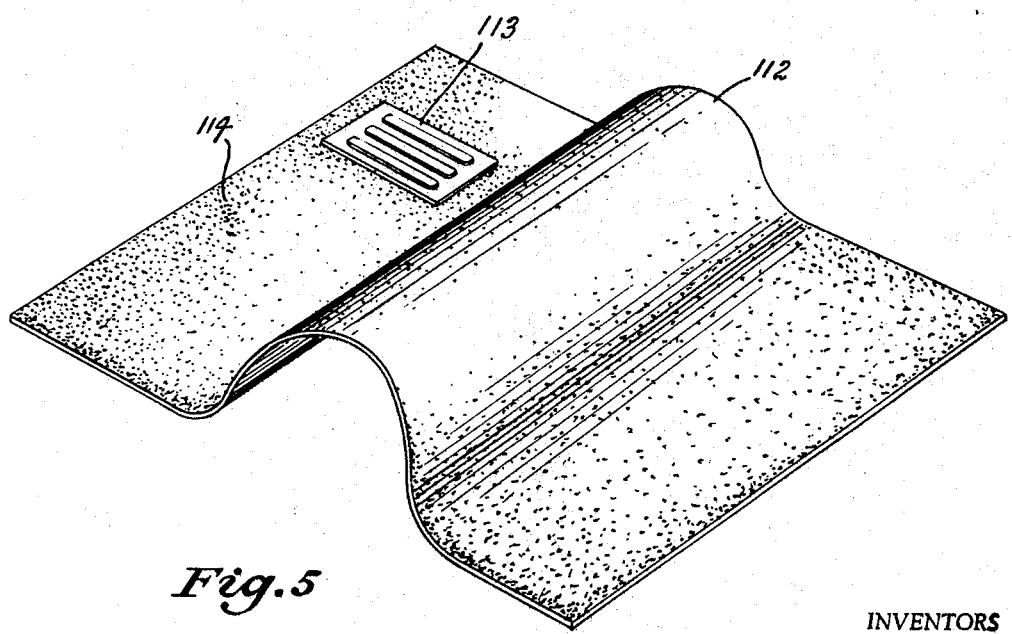
FIG. 5 is a view in perspective of an automotive carpet with a heel pad attached, made according to the instant invention.

In FIG. 5 there is shown an automotive carpet designated generally by 112, having a vinyl heel pad 113 attached thereto. The illustrated carpet has a tufted surface 114. This product was made in accordance with the above-described process and apparatus and the vinyl material was so well bonded to the substrate carpet that it was substantially impossible to separate the materials without pulling the tufts covered by the vinyl out of the burlap backing on the carpet. There was no evidence of "grinning" or protrusion of the tufts through the vinyl heel pad. Furthermore, the product exhibited a definite cushioning effect on that portion of the carpet surface which was covered by the vinyl heel pad. This was true in spite of the fact that a cross section of the heel pad and carpet indicated the carpet tufts to be substantially completely embedded in the vinyl material of the pad throughout substantially the entire lengths of the tufts. Moreover, the peripheral area of the heel pad was exceptionally well bonded to the substrate carpet in contrast to a like heel pad made in accordance with conventional processes.

In the manufacture of the carpet illustrated, vinyl powder was first heated on its lower surface to a temperature of 190° C. for a period of 2 min., 45 seconds. Subsequently, the vinyl powder was heated on its upper surface to a temperature of 190° C. for a period of about 30 seconds. During the last 5 seconds of the time period heat was being applied to the upper surface of the powder, the lower surface thereof was cooled with a water spray except around the periphery. Subsequently, the molten top surface of the vinyl and a preformed tufted nylon/rayon carpet which was subjected to a temperature of about 170° C. on that area to which the vinyl was to be applied were brought into contact with each other in a C-frame press under a pressure of about 350 p.s.i.g. for about 9 seconds. The bonded material was then removed from the press and the mold strip therefrom, leaving the molded heel pad in place on the carpet.

Accordingly, the present process and apparatus provide products of improved quality and which because of excellent bonding strength, have an increased useful life. Furthermore, the process and apparatus provide a substantially completely automated and continuous operation of manufacture. On the other hand if desirable, modification in the process and apparatus can be made to operate in a semi-continuous manner. Numerous other advantages of this invention will be readily apparent to those skilled in the art.

It is to be understood that although the invention has been described and set forth herein in a preferred form thereof, numerous modifications can be made without departing from the spirit and scope thereof, and such modifications are to be understood as coming within the scope of the appended claims

What is claimed is:

1. A process for manufacturing a molded article comprising a substrate having vinyl material attached to at least part of the area of said substrate comprising heating the lower surface of said vinyl material at a temperature and for a time at least sufficient to make the vinyl material molten at least in the vicinity of said lower surface, withdrawing heat from the lower surface of said vinyl material to commence solidification thereof while heating the upper surface of said vinyl material at a temperature and for a time at least sufficient to make the vinyl material molten at least in the vicinity of said upper surface and contacting the molten upper surface of said vinyl material and said substrate with each other until the molten upper surface of said vinyl material solidifies.

2. A process for manufacturing a molded article comprising a substrate having vinyl material attached to at least part of the area of said substrate comprising heating the lower surface of said vinyl material at a temperature and for a time at least sufficient to make the vinyl material molten at least in the vicinity of said lower surface, withdrawing heat from the lower surface of said vinyl material to commence solidification thereof while heating the upper surface of said vinyl material at a temperature and for a time at least sufficient to make the vinyl material molten at least in the vicinity of said upper surface and contacting under pressure the molten upper surface of said vinyl material and said substrate with each other until the molten upper surface of said vinyl material solidifies 3. A process for manufacturing a molded article comprising a textile substrate having vinyl material attached to at least part of the area of said textile substrate comprising heating said vinyl material first on the lower surface thereof at a temperature and for a time sufficient to bring about fusion of said vinyl material at least in the vicinity of said lower surface, withdrawing heat from the lower surface of said vinyl material to cause solidification thereof while simultaneously applying heat to the upper surface of said vinyl material at a temperature and for a time sufficient to bring about fusion thereof in the vicinity of said upper surface, and contacting under pressure the fused upper surface of said vinyl material and said textile substrate with each other until the fused upper surface of said vinyl material solidifies.

4. A process for manufacturing a molded article comprising a textile substrate having vinyl material attached to at least part of the area of said textile substrate comprising introducing vinyl material into an area of confined configuration, heating the lower surface of said vinyl material at a temperature and for a time at least sufficient to make the vinyl material molten at least in the vicinity of said lower surface, cooling the lower surface of said vinyl material to commence solidification thereof while heating the upper surface of said vinyl material at a temperature and for a time at least sufficient to make the material molten at least in the vicinity of said upper surface and contacting the molten upper surface of said vinyl material and said textile substrate with each other until the molten upper surface of said vinyl material solidifies.

5. A process for manufacturing a molded article comprising a textile substrate having vinyl material attached to at least part of the area of said textile substrate comprising introducing vinyl material into an area of confined configuration, heating said vinyl material at a temperature and for a time at least sufficient to make the vinyl material molten, cooling the lower surface of said vinyl material to commence solidification thereof while maintaining the upper surface of said vinyl material at a molten temperature and contacting the molten upper surface of said vinyl material and said textile substrate with each other and permitting the molten upper surface of said vinyl material to cool to a temperature at which it solidifies.

6. A process for manufacturing a molded article comprising a textile substrate having vinyl material attached to at least part of the area of said textile substrate comprising introducing vinyl material into an area of confined configuration, heating said vinyl material at a temperature and for a time at least sufficient to make the vinyl material molten, withdrawing heat from the lower surface of said vinyl material to commence solidification thereof while maintaining the upper surface of said vinyl material at a molten temperature and contacting the molten upper surface of said vinyl material and said textile substrate with each other and permitting the molten upper surface of said vinyl material to cool to a temperature at which it solidifies.

7. A process for manufacturing a molded article comprising a textile substrate having vinyl material attached to at least part of the area of said textile substrate comprising introducing vinyl material into a mold, heating the lower surface of said vinyl material at a temperature and for a time at least sufficient to make the vinyl material molten at least in the vicinity of said lower surface and to remove entrapped air from said vinyl material, cooling the lower surface of said vinyl material to commence solidification thereof while heating the upper surface of said vinyl material at a temperature and for a time at least sufficient to make the material molten at least in the vicinity of said upper surface and contacting under pressure the molten upper surface of said vinyl material and said textile substrate with each other until the molten upper surface of said vinyl material solidifies.

8. A process for manufacturing a molded article comprising a textile substrate having vinyl material attached to at least part of the area of said textile substrate comprising introducing vinyl material into a mold, heating the lower surface of said vinyl material through said mold at a temperature and for a time at least sufficient to make the vinyl material molten at least in the vicinity of the lower surface of said vinyl material and to remove entrapped air therefrom, cooling the lower surface of said vinyl material through said mold to commence solidification thereof while simultaneously heating directly the upper surface of said vinyl material at a temperature and for a time at least sufficient to make the vinyl material molten at least in the vicinity of said upper surface and contacting under pressure the molten upper surface of said vinyl material and said textile substrate with each other until the molten upper surface of said vinyl material solidifies.

9. A process for manufacturing a molded article comprising a textile substrate having vinyl material attached to at least part of the area of said textile substrate comprising heating the lower surface of said vinyl material at a temperature and for a time at least sufficient to make the vinyl material molten at least in the vicinity of said lower surface and to remove entrapped air therefrom, discontinuing heating of said lower surface, heating the upper surface of said vinyl material at a temperature and for a time at least sufficient to make the material molten at least in the vicinity of said upper surface while cooling the lower surface during the terminal portion of the time period heat is being applied to said upper surface to commence solidification of said lower surface while upper surface is still in a fused state, contacting the fused upper surface of said vinyl material and said textile substrate with each other after heating of the upper surface has been discontinued and maintaining contact until the fused upper surface of said vinyl material solidifies.

10. A process for manufacturing a molded article comprising a tufted textile substrate having vinyl material attached to at least part of the tufted surface of said textile substrate comprising heating the lower surface of said vinyl material at a temperature and for a time at least sufficient to make the vinyl material molten at least in the vicinity of said lower surface and to remove entrapped air therefrom, discontinuing heating of said lower surface, heating the upper surface of said vinyl material at a temperature and for a time at least sufficient to make the material molten at least in the vicinity of said upper surface while cooling the lower surface during the terminal portion of the time period heat is being applied to said upper surface to commence solidification of said lower surface while said upper surface is still in a molten state, contacting the molten upper surface of said vinyl material and the tufted surface of said textile substrate with each other after heating of the upper surface has been discontinued and maintaining contact until the molten upper surface of said vinyl material solidifies.

11. A process for manufacturing a molded article comprising a tufted textile substrate having vinyl material attached to at least part of the tufted surface of said textile substrate comprising heating the lower surface of said vinyl material at a temperature and for a time at least sufficient to make the vinyl material molten at least in the vicinity of said lower surface and to remove entrapped air therefrom, discontinuing heating of said lower surface, heating the upper surface of said vinyl material at a temperature and for a time at least sufficient to make the material molten at least in the vicinity of said upper surface while cooling the lower surface during the terminal portion of the time period heat is being applied to said upper surface to commence solidification of said lower surface while said upper surface is still in a molten state, contacting under pressure the molten upper surface of said vinyl material and the tufted surface of said tufted textile substrate with each other after heating of the upper surface has been discontinued and embedding the tufts of said tufted textile substrate in the molten upper surface of said vinyl material and maintaining contact between the molten upper surface of said vinyl material and said tufted textile substrate with the tufts embedded in said vinyl material until the molten upper surface of said vinyl material solidifies, thereby bonding said vinyl material and said tufted textile substrate to each other.

12. A process for manufacturing a molded article comprising a tufted textile substrate having vinyl material attached to at least part of the tufted surface of said textile substrate comprising heating the lower surface of vinyl powder at a temperature and for a time at least sufficient to make the vinyl powder molten at least in the vicinity of said lower surface and to remove entrapped air therefrom, discontinuing heating of said lower surface, heating the upper surface of said vinyl powder at a temperature and for a time at least sufficient to make the powder molten at least in the vicinity of said upper surface while cooling all the lower surface except the peripheral area during the terminal portion of the time period heat is being applied to said upper surface to commence solidification of said lower surface while said upper surface is still in a molten state, heating the tufted textile substrate, contacting under pressure the molten upper surface of said vinyl material and the tufted surface of said tufted textile substrate with each other after heating of the upper surface has been discontinued and embedding the tufts of said tufted textile substrate in the molten upper surface of said vinyl material and maintaining contact between the molten upper surface of said vinyl material and said tufted textile substrate with the tufts embedded in said vinyl material until the molten upper surface of said vinyl material solidifies, thereby bonding said vinyl material and said tufted textile substrate to each other.

13. A process for manufacturing a molded tufted automobile carpet having a vinyl heel pad attached to at least part of the surface of the tufted carpet comprising introducing a vinyl powder into a mold, heating the lower surface of said vinyl powder at a temperature and for a time at least sufficient to make the vinyl powder molten at least in the vicinity of said lower surface and to remove entrapped air therefrom, discontinuing heating of said lower surface, heating the upper surface of said vinyl powder at a temperature and for a time at least sufficient to make the material molten at least in the vicinity of said upper surface while cooling all the lower surface except the peripheral area during the terminal portion of the time period heat is being applied to said upper surface to commence solidification of said lower surface while said upper surface is still in a molten state, heating the tufted carpet, contacting under pressure the molten upper surface of said vinyl powder and the tufted surface of said tufted carpet with each other after heating of the molten upper surface of said vinyl powder has been discontinued and embedding the tufts of said tufted carpet in the molten upper surface of said vinyl powder and maintaining contact between the molten upper surface of said vinyl powder and said tufted carpet with the tufts embedded in said molten vinyl powder until the molten upper surface of said vinyl powder solidifies, thereby bonding said vinyl powder and said tufted carpet to each other.

No references cited.

ROBERT F. WHITE, *Primary Examiner.*

K. J. HOVET, *Examiner.*